United States Patent
Birt et al.

(10) Patent No.: US 11,870,052 B2
(45) Date of Patent: Jan. 9, 2024

(54) SPRAYED FORMATION OF BATTERIES

(71) Applicant: Worcester Polytechnic Institute, Worcester, MA (US)

(72) Inventors: Aaron M. Birt, Worcester, MA (US); Diran Apelian, West Boylston, MA (US); Joseph Heelan, Woodstock, CT (US); Ryan Mocadlo, Worcester, MA (US); Ali Valamanesh, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 795 days.

(21) Appl. No.: 16/783,657

(22) Filed: Feb. 6, 2020

(65) Prior Publication Data
US 2020/0176752 A1 Jun. 4, 2020

Related U.S. Application Data

(63) Continuation-in-part of application No. 15/814,781, filed on Nov. 16, 2017, now abandoned.
(Continued)

(51) Int. Cl.
*H01M 10/04* (2006.01)
*H01M 10/0525* (2010.01)
(Continued)

(52) U.S. Cl.
CPC ....... *H01M 4/0419* (2013.01); *H01M 4/1393* (2013.01); *H01M 4/1395* (2013.01);
(Continued)

(58) Field of Classification Search
CPC ............. H01M 4/0419; H01M 4/1393; H01M 4/1395; H01M 4/505; H01M 4/525; H01M 10/0525; H01M 10/0562
See application file for complete search history.

(56) References Cited

U.S. PATENT DOCUMENTS 5,272,021 A 12/1993 Asai et al.
5,302,414 A 4/1994 Alkhimov et al.
(Continued)

FOREIGN PATENT DOCUMENTS

CN 102376942 B 2/2015
RU 2402839 C1 10/2010

OTHER PUBLICATIONS

Edward Samuel, "Supersonic cold spraying of titania nanoparticles on reduced graphene oxide for lithium ion battery anodes;" Journal of Alloys and Compounds 75 (2017), 161-169; Apr. 28, 2017.
(Continued)

*Primary Examiner* — James Lee
(74) *Attorney, Agent, or Firm* — Armis IP Law, LLC

(57) ABSTRACT

A rechargeable lithium-ion (Li-ion) battery employs a low temperature approach to battery manufacturing that forms charge material from kinetic energy of high velocity particles impelled into an aggregation such that bombardment of the particles against other particles in the aggregation forms a charge conveying structure. High velocity bombardment from a carrier gas nozzle accumulates an active charge material in a layered arrangement for the finished battery. Preparation of the particles, such as by ball milling or spraydrying, arranges particle agglomerations. The particle agglomerations, when impelled against other agglomerations or a current collector, forms a layer of cathodic, anodic or electrolytic battery material. The metallic binder conveys charge for mitigating or eliminating a need for a planar current collector underlying the sprayed layer. The resulting layers are suitable for battery operation, and are manufactured in an absence of any solvent drying or disposal.

21 Claims, 4 Drawing Sheets

Related U.S. Application Data

(60) Provisional application No. 62/550,846, filed on Aug. 28, 2017, provisional application No. 62/423,237, filed on Nov. 17, 2016.

(51) Int. Cl.

| | |
|---|---|
| *H01M 10/0562* | (2010.01) |
| *H01M 4/04* | (2006.01) |
| *H01M 4/1393* | (2010.01) |
| *H01M 4/505* | (2010.01) |
| *H01M 4/525* | (2010.01) |
| *H01M 4/1395* | (2010.01) |

(52) U.S. Cl.
CPC ........... *H01M 4/505* (2013.01); *H01M 4/525* (2013.01); *H01M 10/0525* (2013.01); *H01M 10/0562* (2013.01)

(56) References Cited

U.S. PATENT DOCUMENTS

| | | | |
|---|---|---|---|
| 6,203,944 | B1 | 3/2001 | Turner et al. |
| 6,680,145 | B2 | 1/2004 | Obrovac et al. |
| 2002/0055041 | A1 | 5/2002 | Kobayashi et al. |
| 2005/0233066 | A1 | 10/2005 | Sunagawa et al. |
| 2012/0107683 | A1 | 5/2012 | Kim et al. |
| 2012/0231353 | A1 | 9/2012 | Bulan et al. |
| 2014/0011069 | A1* | 1/2014 | Zhou ................ H01M 10/058 429/160 |
| 2014/0072875 | A1 | 3/2014 | Uchiyama |
| 2014/0099556 | A1 | 4/2014 | Johnson et al. |
| 2015/0104714 | A1* | 4/2015 | Galande .................. H01M 4/72 429/233 |
| 2016/0156021 | A1 | 6/2016 | Ahara et al. |
| 2018/0138494 | A1* | 5/2018 | Birt ....................... H01M 4/382 |

OTHER PUBLICATIONS

Jong-Gun Lee, "Stable High-Capacity Lithium Ion Battery Anodes Produced by Supersonic Spray Deposition of Hematite Nanoparticles and Self-Healing Reduced Graphene Oxide;" Electrochimica Acta 228 (2017) 604-610; Jan. 20, 2017.

Kohei Okuyama, "Preparation and Electrochemical Evaluation of LiCoO2 Film Prepared with Cold Spraying for Development of Lithium-Ion Battery," ECS Transactions, 75 (20) 191-199 (2017), 10.1149/07520.0191ecst @The Electrochemical Society.

Vladimir. F. Kosarev, "Recently Patented Facilities and Applications in Cold Spray Engineering," Recent Patents on Engineering 2007, 1, 35-42; Institute of Theoretical and Applied Mechanics, SD RAS, Novosibirsk, Russia; Nov. 11, 2006.

International Search Report, PCT/US2017/061943, dated Mar. 5, 2018, pp. 2.

U.S. Stoneware. "Jar, Ball and Pebble Milling Theory and Practice" (2010). Retrieved from http://www.usstoneware.com/PDF/Theory%20and%20Practice.pdf ( Year: 2010), pp. 1-12.

\* cited by examiner

SPRAYED FORMATION OF BATTERIES

RELATED APPLICATIONS

This application is a CIP of U.S. patent application Ser. No. 15/814,781, filed Nov. 16, 2017, entitled "KINETIC BATTERIES," which claims the benefit under 35 U.S.C. § 119(e) of U.S. Provisional Patent Application No. 62/423,237, filed Nov. 17, 2016, entitled "KINETIC BATTERIES," and U.S. Provisional Patent Application No. 62/550,846, filed Aug. 28, 2017, entitled "SPRAYED LAYER BATTERY CONSTRUCTION," both incorporated herein by reference in entirety.

BACKGROUND

Conventional rechargeable batteries, such as lithium ion batteries are manufactured by spreading, rolling, and drying a slurry of conductive polymer binder, toxic solvent, conductive agent, and lithium-based oxide (or other ceramic) particles onto a conductive current collector to form a functional cathode. This limits the size, geometry, and energetic properties of the resulting batteries. The prevailing conventional method for electrode production, known as tape casting, depends on mixing a slurry of at least four ingredients, spreading the mixture across the current collector using a Doctor blade, calendaring the coating to control surface finish, and then baking out the solvent to induce porosity.

SUMMARY

A rechargeable lithium-ion (Li-ion) battery employs an agglomeration approach to battery manufacturing that forms charge material layers from kinetic energy of high velocity particles impelled into an aggregation such that bombardment of the particles against other particles in the aggregation forms a charge conveying structure having a suitable structure and density for high performance charge flow. Sprayed bombardment of the agglomerations forms a network of an electronic conducting media, a lithium-ion conducting medium, and an active electrode material (cathode or anode). High velocity bombardment from a carrier gas nozzle therefore accumulates an active charge material (active material) and conductive binder in a layered arrangement for the finished battery. The formed agglomerations (agglomerates) therefore provide the structural binding agent, the electron conducting agent, and a deformation phase responsible for cohesion of the sprayed agglomerate particles. Preparation of the particles, such as by ball milling, cryogenic mixing or spray drying, arranges particle agglomerations. The particle agglomerations, when impelled against other agglomerations or a current collector, forms a layer of cathodic or anodic battery material. The polymer or metallic binder conveys charge for mitigating or eliminating a need for a planar current collector underlying the sprayed layer. The resulting layers are suitable for battery operation, and are manufactured in an absence of any solvent drying or disposal.

Configurations herein are based, in part, on the observation that lithium ion batteries are achieving widespread popularity for mobile power needs of electric vehicles and personal devices. Rechargeable power supplies such as lithium ion batteries are generally sought for their high energy density and their ability to deliver current at a high rate. Unfortunately, conventional approaches to battery manufacturing suffer from the shortcoming of solvent based approaches that impose toxicity and environmental concerns for use, handling and disposal of the solvent. Accordingly, configurations herein substantially overcome the toxicity and handling shortcomings by providing a spray based manufacturing method that forms cathode, anode and electrolyte layers from high velocity particle spraying that forces the charge materials into a conformant arrangement conducive to charge generation and transport. Further, the flexibility of particle spray deposition to electrode fabrication allows architecture of non-standard battery geometries to suit implementation specific volume or electrochemical constraints.

A particle stream of precision milled particles engages and accumulates the particles into a distribution suitable for battery operation, as successive particles are forced together in a binding arrangement sufficient for charge transport. Spraying, as employed herein, refers to impelling or forcing the particle agglomerations though a nozzle using a pressurized carrier gas such that they bombard an accumulation surface and build a thickness as bombarded by successive agglomerations due to deformation and ductility of the agglomerations. In contrast to conventional uses of cold spray, the particle preparation forms agglomerations that, in conjunction with impelling from the nozzle, aggregate based on the ductile nature of the agglomerations into a density suitable for battery usage. In this manner, a layer of charge materials may be deposited onto a current collector for subsequent rolling, folding, or layering for a finished battery, or multiple layers defining cathode, anode and electrolyte regions may be continuously sprayed as a complete structure without a need for a conductive current collector. Each layer of either cathode, anode, or electrolyte region may be controlled for composition, porosity, and geometry by altering the powder feedstock and spray conditions. Doing so allows for customization of the charge/discharge profiles of the battery cell.

The disclosed approach presents a solvent-less approach to battery manufacturing in which the core constituents are a powdered material. The process takes an active material blended with a metal binder and sprays the material at supersonic speeds onto a current collector. Additional additives such as carbon black, stearic acid, or a solid electrolyte may be blended with the powder and sprayed for varying benefits. The end result is a battery electrode produced at lower costs, with greater control over the battery internal geometry and overall thickness. This enables higher capacity batteries, and batteries that can operate at higher charge/discharge rates with reduced overall heating. Alternate configurations include multiple layer sprays for forming respective cathode, electrolyte and anode layers, and an absence of an underlying current collector achieved by dispersing conductive particles in the sprayed material.

In one configuration, the spray formed batteries may employ solid state manufacturing for heating and cooling polymers around a glass transition temperature $T\_g$ to bind lithium oxide or phosphate particles with a metallic phase to create the cathode, anode or separator layers. This approach decreases interface resistances, enables local control of energetic properties, and allows for manufacture of custom-sized cathodes without the inactive materials such as binders and toxic solvents used in traditional manufacturing.

Other approaches may eliminate the planer current collector, typically a copper or aluminum sheet, and deposit multiple layers in succession for cathode, electrolyte and anode layers in one pass from multiple nozzle rows. Degrading or disintegrating polymers may be incorporated to assist particle flow and adhesion.

Battery components, such as the cathode and anode layers, are constructed via an additive manufacturing technique that can consolidate these materials in the solid state. The cold spray process accelerates particulate matter to supersonic speeds through a converging-diverging nozzle using a high temperature, high pressure carrier gas. At these accelerated speeds it is possible to create conformal contact between ductile-ductile or ductile-ceramic materials through extreme deformation along the particle boundaries. It has been shown in many cases that a small fraction of ductile metallic binder can be used to deposit non-deformable ceramic particles onto a metal substrate. For example, deposition of $Al_2O_3$ with aluminum has been found to optimize certain properties at around 15% $Al_2O_3$, however deposition occurs as high as 75%.

In further detail, the method of forming a battery using sprayed battery construction as disclosed herein includes agitating particles to form particulate agglomerates adapted for cold spray deposition. The agglomerate includes cathode material for a battery defined by conductive particles and charge material particles. Anode material and a separator layer of electrolyte may also be formed. A nozzle sprays the agitated particulate mixture into a layered structure configured to define at least a portion of the battery by accelerating the particulate mixture for conformal communication between the particles in the particulate mixture to promote charge flow. Therefore, the particles are impelled and bombarded in such a manner that they deform slightly into a density suitable for ionic communication and transportation of electrical energy (electrons).

A corresponding apparatus for forming the sprayed, or additive, battery includes an agitator for agitating particle feedstock to form agglomerations of feedstock for the battery, and a hopper for storing a particulate mixture resulting from agitating the feedstock. A carrier gas propels the particulate mixture through a vessel, and a shaped nozzle receives the propelled, particulate mixture and impels the particulate mixture for conformal communication between the particles in the particulate mixture resulting from bombardment of the agglomerated particles to promote subsequent charge flow once manufactured into a battery.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example of battery construction. Construction employs sprayed particulate matter, such as high pressure cold spray, low pressure cold spray or similar additive manufacturing technique. In contrast to conventional solvent based approaches, using a slurry of charge material and binder liquids followed by evaporation, the active material is sprayed with a conductive metal binder and optional solid electrolyte polymer powder to form a proper density from the spray velocity without melting or dissolving constituent materials into a liquid state.

Formation of the battery structure may include depositing either a cathodic or anodic active material onto a current collector, or a "collector-less" arrangement which forms a cathode, electrolyte and anode layer in succession and in the absence of a current collector.

A first configuration overcome conventional shortcomings of solvent based polymeric binders by combining a cathode material and a metallic binder to form a powdered combination, and spraying the powdered combination onto a current collector. Spraying includes a cold spray process operable for iterative spraying of the powdered combination for forming a multi-layer thickness of the powdered combination on the current collector. The metallic binder includes a single phase high purity aluminum alloy, and the powdered combination may be devoid of a polymeric binder for avoiding conventional solvents and drying/evaporation. The resulting layered current collector is formed into a battery of suitable size and dimensions. An alternate approach using a polymer cold spray binder is discussed below in FIGS. 5 and 6.

Figure 1:
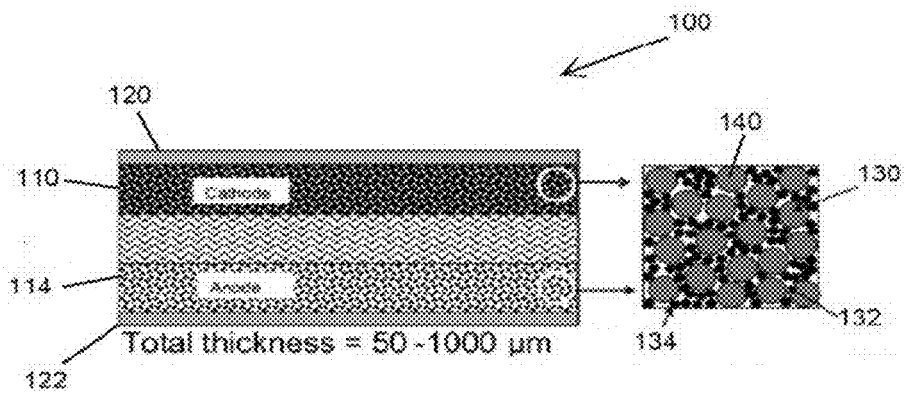
FIG. 1 is a context view of a battery layers.

FIG. 1 is a context view of a battery layers. In a layered structure 100, a cathode layer 110, electrolyte layer 112 and anode layer 114 are disposed between opposed current collectors for a cathode 120 and anode current collectors 122. The cathode 110 and anode 114 layers define a particle network 130. Conventional batteries employ a solvent derived arrangement to disperse active material 140 with binder 132 and conductive material 134. The disclosed approach forms a layer from high velocity (e.g. supersonic) particles sprayed to bombard other particles and form the particle network 130, rather than mixing and layering using volatile and/or toxic solvents.

In contrast to the precisely controlled atmosphere and concentrations needed in tape casting, the disclosed kinetic batteries employ only two components: cathode powder and metallic binder. $LiFePO_4$ (LFP) was selected as one cathode material of choice due to its low cost and high levels of safety, however any active chemistry for either the anode or cathode can be easily substituted for LFP. Rather than using a slurry with a polymer, solvent, plasticizer, etc., a single phase high purity aluminum alloy defines the metallic binder. The cathode powder with approximate size range of 0.1-15 micrometers will be ball milled with the high purity aluminum powder to produce "snowballs" that will be cold sprayed onto a high purity aluminum substrate. Aluminum tends to be a highly ductile material that cold sprays readily, especially in unalloyed form.

Figure 2:
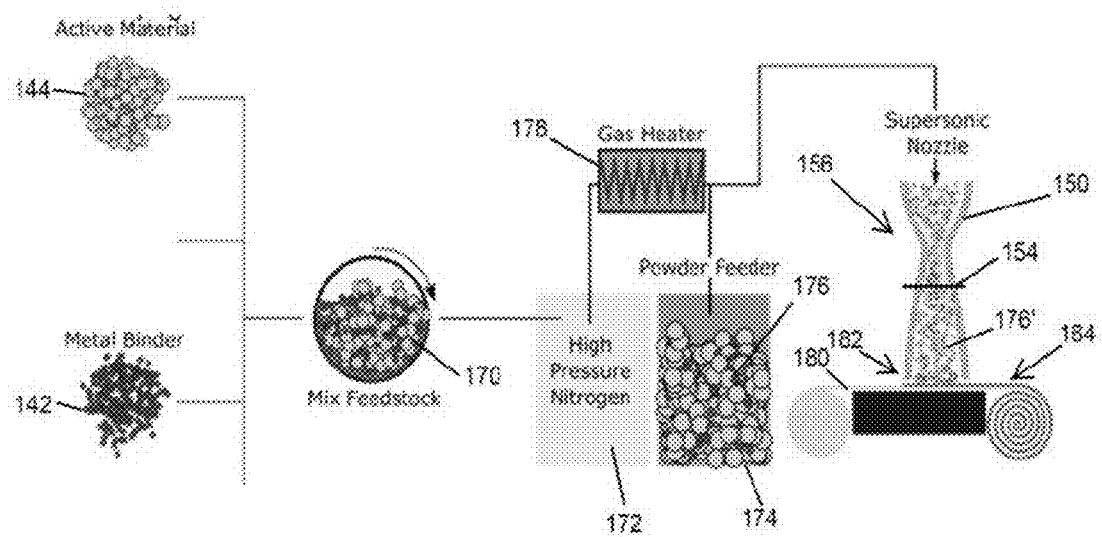
FIG. 2 shows a flow diagram of particles impelled to produce the layers of FIG. 1.

FIG. 2 shows a flow diagram of impelled particles. Referring to FIGS. 1-2, the active material (either cathode or anode) 144 and the metal binder 142 are inputs to the process. The metal binder 142 performs similarly to the binder, electrolyte and optionally, the current collector in conventional approaches by fixing the charge material in a configuration for electron transport to generate a current flow. The metal binder 142 and active material 144 combine in a particle mixture suitable for forming a sprayed battery. An agitator 170 for ball milling is employed for agitating the particles into an agglomerated particulate mixture adapted for cold spray deposition, in which the particulate mixture defines cathode material for a battery by including conductive particles and charge material particles. Alternate treatment for preparing the particulate mixture may also be performed, discussed below. In general, agitating refers to creating a feedstock including a plurality of agglomerations, such that each agglomeration includes at least conductive particles and charge material. Any suitable milling, grinding or physical manipulations of the particle feedstock may be employed. The agglomerations, or clusters of the particles in the particulate mixture 176, allow for a density conducive to charge storage and production once propelled into the layered arrangement 164. A properly milled or agitated metal used for the conductive particles is beneficial because it can serve as both the binding and conducting agent within one structure, and therefore provide properties of conventional binders and current collectors.

The particle mixture 176 passes to a powder feeder 174 such as a hopper, where a carrier gas such as high pressure nitrogen 172 is employed for spraying the agitated particulate mixture 176 into a layered structure or arrangement 164 configured to define at least a portion of the battery. A heater 178 adjusts a temperate of the carrier gas to an optimal level for particle deposition, as an alternative or in conjunction with laser heating as in FIG. 1. Each particulate (particle) mixture 176 is suited for either a cathode, anode or electrolyte layer by accelerating the particulate mixture for conformal communication between the particles in the particulate mixture 176 to promote charge flow. Particles of electrolytic materials (electrolyte) may be mixed with the cathodic and anodic mixtures, and also for defining the electrolyte layer between them. Solid electrolytes having suitable ductility for the high velocity spraying include solid ceramic and solid polymer electrolytes. It should be noted that in the case of the electrolyte layer formation, discussed further below, a charge material is not needed.

The nozzle 150 includes an apparatus for connecting the pressurized carrier gas supply to the shaped nozzle 150 and has a flow directed towards the accumulative layered structure (arrangement) 164. In order to achieve the particle velocity for bombardment into the conformant, slightly deformed shape conducive to charge flow, the shaped nozzle 150 has a substantially round cross section 154 with a reduced diameter 156 along a central portion of its length and adapted for converting heat energy of the flow into kinetic energy. Alternative nozzle shapes, such as square nozzles, may also be employed. The nozzle 150 focuses and directs the carrier gas propelled particle mixture 176' into the layered arrangement 164 by accelerating the particles to a velocity that, when impelled against the current collector or accumulation surface, respond based on ductility. Such nozzles are capable of achieving supersonic speed by the carrier gas for causing ductile contact between the sprayed particles; alternatively, lower subsonic velocities may be employed. The arrangement of the particles is such that contact is suitable for ionic transfer supporting charge flow, such as metallurgical or intimate contact.

In the example configuration, the nozzle 150 depicts cold spray. Cold spray is a process typically used to deposit ductile metals onto a substrate. In many conventional cases, the substrate is a worn out legacy component that can be repaired via cold spray, or otherwise must be replaced. The unique capability of cold spray is that it uses a small amount of heat to consolidate materials, and instead relies on high amounts of kinetic energy. Supersonic nozzles, meaning nozzles that propel particles at supersonic speeds, helps provide this energy. Alternatively, subsonic nozzles may be employed with a sufficiently deformable polymer, discussed below in FIGS. 5 and 6. This allows materials, both powder and substrate, to remain well below any oxidation or melting temperatures. The result is a process that can deposit with very high efficiencies, with a wide range of materials and material combinations that could otherwise react negatively.

The same processing benefits can be applied to blends of materials, such as ceramics and metallic (cermets) as are disclosed herein. Cold spray may also be employed to deposit polymeric materials in addition to metallic, ceramic, and cermet materials.

In cold spray, there is a limitation on the size of powders that may be sprayed. The typical range is from 25 to 45 µm. This is due to a fundamental limit in the spray process where below a certain impact temperature and velocity (called the critical velocity) materials won't adhere. Small particles are unable to carry their momentum across the fluid dynamic boundary layer on the surface of the substrate and thus never exceed the critical velocity. Note this presupposes, as with typical cold spray processing, that the particles are below their melting temperature.

Several considerations are relevant to the gas impelled, bombardment of dry particles for forming charge material. These considerations are resolved by several parameters, including nozzle velocity, nozzle angle and size, and particle size, as well as the actual composition of the particle mixture. Batteries rely on maximum surface area for the active materials in order to function effectively. This means that the ideal electrode has active material particles that are very small. This would naturally tend to disqualify them from being sprayable by conventional methods. However, by blending the active material particles (typically a ceramic structure-oxide, phosphate, salt, graphite, perovskite, spinel, etc.) with a ductile metallic powder (such as aluminum, copper, tin, titanium, steel, nickel, tantalum, tungsten, lithium) or metal powder alloys of the same such that each particle is a combination of both active material and binder material, then the resulting agglomerated particle meets the criteria both for size and for presence of a ductile phase. This requires that both phases remain in their original chemical state, but be bound together mechanically, via Van der Waals forces, electrostatic forces, or chemical bonds by an additional compound.

In the example arrangement of FIG. 2, the nozzle 150 sprays the particulate mixture 176 onto a conductive planar surface such as a current collector 180 for building the accumulative layered structure. The construction of the nozzle and gas allows for spraying the particle mixture 176 based on a set of predetermined parameters for defining a flow rate of the particle mixture, a pressure of the carrier gas and a standoff distance 182 of an exit of the nozzle to an accumulative layered structure.

Figure 4:
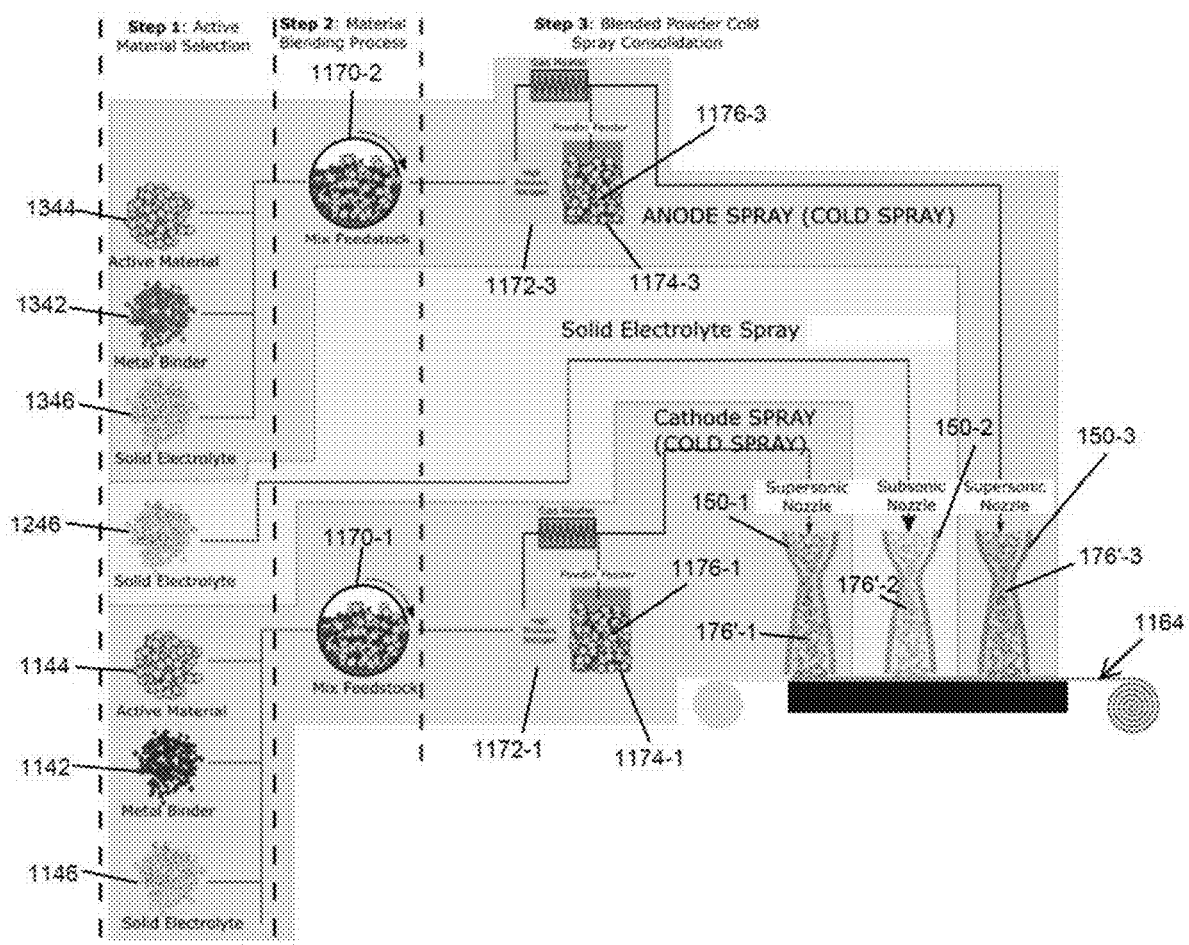
FIG. 4 shows multiple layer fabrication of the layers in FIGS. 1-3C.

The approach of FIG. 2 depicts a single nozzle, which may be rastered back and forth across a surface multiple times, to produce the layers 110, 112, 114, or electrodes. Alternate configurations, discussed below with respect to FIG. 4, employ a large array of nozzles would be used to produce electrodes on a roll-to-roll manufacturing line. The blended or agitated particle mixtures are placed in a powder feeder and carried into the spray lines via a gas stream. As the powders enter the nozzle, they are accelerated to high speeds (supersonic speeds if above the critical pressure). After acceleration, the particles impact onto the appropriate current collector for anode or cathode to directly form the electrode with no post process heating or calendaring. Different parameters affect the resulting layered structure 164, including the following:

Powder flow rate (1-200 grams/minute)
Gas Temperature (25-600° C.)
Gas Pressure (50 to 700 PSI)
    Note that below roughly 120 PSI is subsonic, low pressure cold spray
    Above 120 PSI is supersonic, high pressure cold spray
Nozzle Geometry (Choke Diameter, Expansion Ratio, Exit Length—all critical and customized depending on specific needs)
Nozzle material (WC, Stainless Steel, Polymeric, SiC)
Standoff Distance—distance from nozzle exit to surface (10-100 mm)
Raster speed—the speed at which the nozzle moves relative to the surface or vice versa (5 mm/s to 1000 mm/s)
Index Step—the amount of overlap between lines of spray. Note this could also be considered the overlap between nozzles in an array of nozzles. This varies depending on the nozzle configuration.
Substrate type (Aluminum or copper depending on the anode vs cathode—ranging from 5 μm to 400 μm)
Gas Type (Nitrogen, Helium, or air)
Atmosphere (ideally should be inert based on the gas into the spray chamber)
Substrate and particle temperatures (can be preheated to various temperatures depending on final battery properties)

FIGS. 3A-3C show preparation of particles used for the particle mixtures 176 in the powder feeder 174 in the flow of FIG. 3. Referring to FIGS. 2 and 3A-3C, agglomerations of particles defined by the feedstock processing result in the particle density and conformal arrangement from bombardment upon nozzle 150 exit.

FIG. 3A shows an aluminum core 400 surrounded by particles 402 of active material, created by spray drying, freeze drying, or electrocoating. Agitation may therefore include creating a feedstock including conductive particles circumferentially surrounded by the charge material particles. Agitating may also include ball milling for generating a uniform mixture of the particles. FIG. 3B shows a uniform blended mixture of LFP 410 and aluminum 412 produced by ball milling. FIG. 3C shows agglomerations of aluminum 420 adhering together with active material 412 in a "snowball" texture of feedstock particle mixture 176, which can be produced by spray dry agglomeration or freeze drying. Any of the mixtures in FIGS. 3A-3C may also include a solid electrolyte powder in the agitated particles, for spraying with the agitated mixture. The conductive particles generally include materials such as Al, Cu, Sn and C which are conductive and amenable to powder formations.

In the example of FIG. 3B, planetary ball milling is a lab-scale method of mechanically mixing materials together. In this process, the materials to be mixed are placed in a jar with a quantity of balls. The jar is then rotated about a central axis, and its own axis simultaneously. This results in a machine wherein the large balls can impact the materials thus blending them together in a uniform and spherical fashion. Notable parameters for particle mixture 176 include:

Rotational Speed (100-700 RPM)

Blended Material Composition (active material, metal binder, additive)

5-50% metal binder (Can be any aluminum, copper, tantalum, tin, nickel, lithium, cobalt, vanadium, or iron based alloy or pure material)

0-40% additive (graphite, carbon black, solid electrolyte, solid polymer electrolyte, stearic acid, paraffin wax, etc.)

Remainder active material ($LiNiCoAlO_2$ (NCA), LiNiMnCoO$_2$ (NMC), $LiNi_5Co_3Mn_2O_2$ (Hi-NMC), $LiFePO_4$ (LFP), $LiCoO_2$ (LCO), $LiMn_2O_4$ (LMO), $Li_4Ti_5O_{12}$ (LTO), Graphite, Silicon, Li-Sulfur, Lithium metal, tin, or a mixture of active materials)

Volume of the jar filled (5-65%)

Ball to Material Blend Volume Ratio (1:20 to 30:1)

Size of balls used (1 mm to 20 mm)

Jar and ball materials used ($Al_2O_3$, Stainless Steel, Tungsten Carbide, Silicon Carbide)

Cooling/Heating of the jars (Cooling to liquid nitrogen, heating to 300° C.)

Pre- or Post-processing of materials (fluidized separation, sieving based on particle size or morphology)

Jar atmosphere (inert-Argon/Nitrogen/Helium, Air)

Referring to the structures of FIGS. 3A-3C, spray agglomeration is a process whereby powders to be agglomerated are suspended and dispersed in a liquid medium, typically with a combination of solvent, dispersant, and binder. These materials are injected into a nozzle and atomized via a pressurized gas stream. As the solvent and dispersant evaporate from a droplet, the polymer binder agglomerates together all of the phases of interest. In the case of electrode materials, a small amount of polymer binder could be used to bind the metal binder to the active material. This is another way to produce agglomerated 'granules' that are large enough to spray, have fine active constituents, and maintain the appropriate chemical phase. In contrast to conventional approaches, the liquids employed for particle mixture preparation disintegrate or decompose prior to deposition for forming the layered structure 164, and therefore continue to avoid the solvent drying and disposal shortcomings of conventional approaches.

FIG. 4 shows multiple layer fabrication of the layers in FIGS. 1-3C. The arrangement of FIGS. 2, 3A-3C and 4 depicting a cathode material arrangement, may also be employed for anode material. Further, a complete battery cell requires a cathode layer, and anode layer, and an electrolyte or separator between them to allow for ionic transfer to balance the current flow for battery use (discharge) or charging. A plurality of nozzles may be arranged to deposit particle mixtures for cathode material 176'-1, electrolyte layers 176'-2 and anode layers 176'-3 (176' generally).

Referring to FIGS. 2 and 4, an apparatus including a plurality of nozzles 150 and corresponding hoppers for particle mixtures 176 manufactures a complete battery structure, including cathode, electrolyte and anode layers. The resulting approach forms cathode, electrolyte and anode layers by iteratively spraying additional agitated, particulate mixtures to define a cumulative layered structure 1164 having electrical characteristics of the battery. The nozzles 150-1 . . . 150-3 are adapted for spraying from rows of nozzles defining each of the cathode, electrolyte and anode layers in sequence for a predetermined thickness of a suitable width. Particle mixtures 176 are based on generating the particulate mixture in separate hoppers 1174-1, 1174-3 corresponding to each layer of the layered structure 1164. This may include agitating the particles with a liquid for forming agglomerations in the particle mixture, such that the liquid disintegrates or decomposes prior to deposition. evaporating or disintegrating spray. A cathode material is formed from a metal binder 1142 and an active charge material 1144, as in the single nozzle approach of FIG. 3. An additional solid electrolyte 1146 may also be added. The resulting particle mixture 1176-1 and carrier gas 1172-1 combine to form sprayed mixture 176'-1 from nozzle 150-1. The cathode material forms a bottom layer of the layered structure 1164. Carrier gas 1172-1, 1172-3 provide proper impelling and bombardment velocity for the cathode and anode, respectively. A current collector may be employed, or the conductive nature of the binder, optionally with embedded wires or conductive strands, may replace the current collector.

A solid electrolyte powder 1246 defines the electrolyte or separator layer, and is a uniform composition which may not need particle processing. The sprayed electrolyte mixture 176'-2 is deposited as a second layer on the layered structure 1164 from nozzle 150-2.

An anodic active material 1344 combines with a metal binder 1342 and a solid electrolyte 1346 as the feedstock particle mixture 1176-3 for the hopper 1174-3. Nozzle 150-3 is used for sprayed mixture 176'-3 onto the top layer of the structure 1164 forming the anode.

In various configurations, the particulate mixtures include the agglomerations may be formed from ingredients including a metal binder (aluminum, copper, tantalum, tin, nickel, lithium, cobalt, or iron based alloy or pure material), an additive (graphite, carbon black, solid electrolyte, solid ceramic electrolyte, solid polymer electrolyte, stearic acid, paraffin wax, etc.), and an active material ($LiNiCoAlO_2$ (NCA), $LiNiMnCoO_2$ (NMC), $LiNi_5Co_3Mn_2O_2$ (Hi-NMC), $LiFePO_4$ (LFP), $LiCoO_2$ (LCO), $LiMn_2O_4$ (LMO), $Li_4Ti_5O_{12}$ (LTO), Graphite, Silicon, Li-Sulfur, Lithium metal, tin, or a mixture of active materials).

Other spray processes include any method that deposits material via a process in which a blend of active material and metallic binder (plus optional additives) are consolidated onto a current collector or similar structure. This would include low pressure cold spray, high pressure cold spray, warm spray (where a thermal spray process is cooled via a gas so that particles are impacted below melting conditions), detonation cladding, electrostatic spray and others. Any suitable process which can deposit the agglomerated particles in a layered structure, including 3D printers and additive manufacturing techniques, may be employed.

The materials, nozzle parameters and milling parameters discussed above may be implemented in a variety of configurations to achieve desired battery characteristics. Several example configurations are depicted in the tables below, however other arrangements may of course be employed. These examples are not intended as a definitive or limiting usage of the disclosed approach, but rather merely of an example of the interrelations between the parameters discussed above.

One of the features of cold spray as disclosed herein is a 'critical velocity window,' which defines a combination of velocity and temperature outside of which a material will not adequately deposit via the kinetic deformation mechanisms. This requires powder particles to be in a specific size range so that they can carry sufficient momentum after exiting the nozzle to deform upon impact. However, battery materials require that the active material portion have a maximum surface area, which typically necessitates fine particles. Many conventional approaches employ spraying active materials independent of any binding agent with success only as a single layer of deposition. Powders in the disclosed approach benefit from the feature that each particle is an agglomeration of a metal binding agent and fine active materials. An example of this agglomeration technique via ball milling is disclosed below.

A particular configuration was performed using a 50/50 split of active material and metal binder. However, it was found that because of the larger volume fraction of aluminum powder this resulted in a disproportionate amount of aluminum. Thus, it was determined that the active material loading conditions could be significantly enhanced.

In a successive iteration, the metal binder concentration was reduced to 22% of the total mass, and was milled with methanol as a slurrying agent. This resulted in much more evenly distributed amounts of aluminum in the powder, but with much larger than desired particles. In this sample, powders were on the order of 100-200 µm instead of the desired 20-45.

Maintaining the metal binder fraction at approximately 22%, eliminating the methanol slurry, and reducing the ball milling size to 5 mm resulted in a significant reduction in the average particle sizes. While some particles were still on the order of 100 µm, many more were in the 10-20 µm range.

In order to avoid nozzle clogging, powder uniformity may be beneficial. This may involve the use of additives such as carbon black, or operation of the mill at precise loading conditions to produce highly uniform powders. In either scenario, the final step must be to sieve the powders into the final desired size range. Improved performance results from a ball mill that rotates in a vertical plane, rather than a horizontal plane. Stainless steel milling media became the material of choice. Table I depicts particular agitation parameters.

TABLE I

| | |
|---|---|
| Method Used | Vertical Planetary Ball Mill |
| Jar Material | Stainless Steel |
| Ball Material | Stainless Steel |
| Ball Size (mm) | 15 mm |
| Active Material | $LiFePO_4$ |
| Metal Binder | Aluminum 99.9% |
| Additive | NA |
| Mass Fraction Active (%) | 20% |
| Mass Fraction Metal (%) | 80% |
| Additive Mass Fraction (%) | 0 |
| Ball to Powder Mass Ratio (:) | 11:1 |
| Rotational Speed (RPM) | 400 RPM |
| Milling Time (Minutes) | 450 |

The method of agglomerating a powder and spraying it via cold spray onto the current collector has been used to form a thin (~10 µm thick) cathode. This demonstrates that the method is practical and forms a functional battery. However, it also shows that the specific capacity is lower than the theoretical limit (170 mAh/g) of standard LFP. This is largely due to inconsistencies in the active material measurements at the external test facility.

A notable feature in the production of these powders is the rotational speed and the size of the balls used in the processing, as depicted in table II below

TABLE II

| | |
|---|---|
| Method Used | Horizontal Planetary Ball Mill |
| Jar Material | $Al_2O_3$ |
| Ball Material | $Al_2O_3$ |
| Ball Size (mm) | 5 mm |
| Active Material | $LiFePO_4$ |
| Metal Binder | Aluminum 99.9% |
| Additive | Carbon Black |
| Mass Fraction Active (%) | 68% |

TABLE II-continued

| | |
|---|---|
| Mass Fraction Metal (%) | 19% |
| Additive Mass Fraction (%) | 13% |
| Ball to Powder Mass Ratio (:) | 8:1 |
| Rotational Speed (RPM) | 600 RPM |
| Milling Time (Minutes) | 180 |

A range of spray parameters were tested on this powder. Gas temperatures as low as 100° C. were evaluated and found to produce minimal deposition. After several iterations, it was determined that a longer standoff distance (50 mm) and slow raster speed (20 mm/s) enabled the deposition of a thin layer of cathode material, as shown in Table III.

TABLE III

| | |
|---|---|
| Gas Used | Nitrogen |
| Gas Temperature | 400° C. |
| Gas Pressure | 435 PSI |
| Powder Used | 68% LFP, 19% Al, 13% Carbon Black |
| Substrate Used | Al Foil |
| Powder Feed Rate (RPM) | 6 RPM |
| Standoff Distance (mm) | 35 |
| Raster Speed (mm/s) | 20 |
| Electrode Thickness | 10 μm |

It is a significant feature that cathodes of varying thickness be produced via the disclosed process. To that end, three different powders containing approximately 10, 20, and 30% metal binder content by mass were produced. These powders contained no additives, and were produced using a different, newly optimized set of milling conditions that provided a maximum dispersion of metal binder within the active material matrix. These three different powders were each used to consolidate electrode sheets of three different thicknesses—nominally 30, 80, and 150 μm respectively. A series of spray processing conditions was evaluated where raster speed, gas temperature, and powder feeder rate were all altered until finding an ideal set of deposition conditions for this powder set. To produce thicker electrodes, multi-layer buildups are used until the desired thickness is reached.

In a particular configuration, depicting a 10% Aluminum, 30 μm thick electrode, the 10% aluminum binder powder and electrode demonstrated the process capabilities at low binder fractions. The powder is uniform and results in a thin electrode coating on the order of 25-40 μm. Agitation parameters are detailed in Table IV.

TABLE IV

| | |
|---|---|
| Method Used | Vertical Planetary Ball Mill |
| Jar Material | Stainless Steel |
| Ball Material | Stainless Steel |
| Ball Size (mm) | 15 mm |
| Active Material | LiFePO$_4$ |
| Metal Binder | Aluminum 99.9% |
| Additive | NA |
| Mass Fraction Active (%) | 10% |
| Mass Fraction Metal (%) | 90% |
| Additive Mass Fraction (%) | 0 |
| Ball to Powder Mass Ratio (:) | 12:1 |
| Rotational Speed (RPM) | 400 RPM |
| Milling Time (Minutes) | 450 |

Spray consolidation conditions were adjusted several times before determining an optimal process recipe. For this sample, a single layer was produced by rastering across the foil surface several times. Each raster line was overlapped by 1 mm. Surface uniformity may be improved by adjusting that raster overlap or by altering the spray angle to induce a greater amount of shear deformation upon impact, and is depicted in Table V.

TABLE V

| | |
|---|---|
| Gas Used | Nitrogen |
| Gas Temperature | 410° C. |
| Gas Pressure | 600 PSI |
| Powder Used | 10% Al, 90% LFP |
| Substrate Used | Al Foil |
| Powder Feed Rate (RPM) | 12 RPM |
| Standoff Distance (mm) | 35 |
| Raster Speed (mm/s) | 300 |
| Electrode Thickness | 25-40 μm |

A thicker electrode produced with approximately 20% aluminum binder by weight was also produced, using the powder processing of Table VI. This electrode was deposited to between 50 and 60 μm. While the extra binder content is not critical for deposition of thicker electrode materials, it provides greater flexibility in the spray processing parameters, shown in Table VII.

TABLE VI

| | |
|---|---|
| Method Used | Vertical Planetary Ball Mill |
| Jar Material | Stainless Steel |
| Ball Material | Stainless Steel |
| Ball Size (mm) | 15 mm |
| Active Material | LiFePO$_4$ |
| Metal Binder | Aluminum 99.9% |
| Additive | NA |
| Mass Fraction Active (%) | 20% |
| Mass Fraction Metal (%) | 80% |
| Additive Mass Fraction (%) | 0 |
| Ball to Powder Mass Ratio (:) | 11:1 |
| Rotational Speed (RPM) | 400 RPM |
| Milling Time (Minutes) | 450 |

TABLE VII

| | |
|---|---|
| Gas Used | Nitrogen |
| Gas Temperature | 410° C. |
| Gas Pressure | 600 PSI |
| Powder Used | 20% Al, 80% LFP |
| Substrate Used | Al Foil |
| Powder Feed Rate (RPM) | 12 RPM |
| Standoff Distance (mm) | 35 |
| Raster Speed (mm/s) | 300 |
| Electrode Thickness | 50-60 μm |

While the structure of most tape-cast batteries includes significant void porosity, the disclosed electrodes provide a fine distribution of microporosity throughout the coating, which enables electrolyte penetration and lithium-ion conduction.

Anode powders containing graphite and copper have also been produced. Two different powders are shown below in TABLES VIII and IX to highlight the interaction of ball size relative to the final powder morphology. Note that due to the high density of copper relative to graphite, there is a significantly larger mass fraction of copper binder, but an equivalent volume fraction to the cathode work performed. In the first powder below, long tendrils have copper have been produced in a matrix of graphite powder. This was done with large, 15 mm stainless steel balls. The second powder in Table IX was produced using smaller, 10 mm balls. While the overall agglomerate size is smaller, there is also less deformation and blending of the copper phase in the graphite. By increasing the rotational speed or milling time, it is possible to achieve greater homogeneity.

TABLE VIII

| | |
|---|---|
| Method Used | Vertical Planetary Ball Mill |
| Jar Material | Stainless Steel |
| Ball Material | Stainless Steel |
| Ball Size (mm) | 15 mm |
| Active Material | Artificial Graphite |
| Metal Binder | Copper 99% |
| Additive | NA |
| Mass Fraction Active (%) | 48% |
| Mass Fraction Metal (%) | 52% |
| Additive Mass Fraction (%) | 0 |
| Ball to Powder Mass Ratio (:) | 10:1 |
| Rotational Speed (RPM) | 400 RPM |
| Milling Time (Minutes) | 450 |

TABLE IX

| | |
|---|---|
| Method Used | Vertical Planetary Ball Mill |
| Jar Material | Stainless Steel |
| Ball Material | Stainless Steel |
| Ball Size (mm) | 10 mm |
| Active Material | Artificial Graphite |
| Metal Binder | Copper 99% |
| Additive | NA |
| Mass Fraction Active (%) | 48% |
| Mass Fraction Metal (%) | 52% |
| Additive Mass Fraction (%) | 0 |
| Ball to Powder Mass Ratio (:) | 10:1 |
| Rotational Speed (RPM) | 400 RPM |
| Milling Time (Minutes) | 450 |

In alternate configurations, a spray apparatus employs a substantially divergent-to-straight straight spray nozzle with an inert gas propellant (nitrogen), and a novel spray process including solid-state electrolytes, in particular polymer electrolytes. Agglomerations of powders are formed by either a spray drying or a cryo-granulation approach, which is beneficial given the very 'sticky' nature of the polymers being used. The disclosed spray process uses subsonic velocities with high temperatures and the divergent-to-straight nozzle in order to effectively consolidate solid-state Li-ion batteries.

For proper lithium-ion intercalation, it is significant that battery electrodes are composed of a homogenous network of an electronic conducting media, a lithium-ion conducting medium, and an active electrode material (cathode or anode). In conventional liquid electrolyte cells, a Li-metal-oxide acts as the active material on the cathode side, artificial graphite acts as the active material on the anode side, high surface area conductive carbon conducts electricity to and from the current collectors, and liquid electrolyte enables diffusion of lithium ions from one side of the cell to the other during charging and discharging. Each material serves a necessary purpose. Performance of the cell is reduced if electronic or lithium ion pathways are obstructed in any way.

In traditional batteries, electrodes are carefully mixed with a solvent to enable both the proper contact between the active material and conductive media and enough porosity for liquid electrolyte diffusion. For a battery manufactured using a solvent-less, dry spray process, powder agglomerates form such that when deposited, proper contact between all three components of the electrode are maintained. Formation and deposition of powder agglomerates defines conductivity and bond strength of the powders in the agglomerates.

The disclosed method of forming a solid state battery is performed by forming agglomerates including a conductive medium, a lithium-ion transport medium and an active charge material, such that the agglomerates include particles of evenly dispersed, homogenous bonded powders, and propelling the agglomerates at a predetermined temperature and predetermined pressure for proper deposition. The predetermined temperature is based on a glass transition temperature of a conductive polymer defining the conductive medium, and the pressure is based on deformation of the agglomerates upon impact at the predetermined temperature. The gas-driven agglomerates are directed by the nozzle, and accumulate the sprayed agglomerates for deforming the agglomerates responsive to an impact against a collection surface, thus forming a layered structure for an active charge material layer of a battery based on the deformation.

Conventional spray approaches to battery construction do not provide an ability to consolidate, via cold spray, battery components into a multi-layered structure (cathode, anode, or separator) using either liquid-electrolyte or solid-electrolyte production methods. This is because all methods lack key components for production: First, to produce a multi-layered electrodes of any type (solid or liquid), it is required that the particulate be a homogeneous mixture of active material, conductive material, and binder. In the case of solid-state electrodes, it is further required that they contain an electrolyte phase. Without doing so, the resulting conventional electrode will not be homogeneous and instead will have large regions with too much or too little of each phase, creating regions of high and low resistance that will not result in an effective battery and in most cases will not produce a functional battery structure.

Further, during deposition, the parameters of the process must be precisely tuned for the particles defining the agglomerates, generally in a size range of 10-50 µm, however various size ranges may be employed. In the case of a conventional liquid electrolyte cell, the deposit must result in a coating that contains some amount of porosity. This means that the structure of these particles is key such that there is natural porosity between particles after deposition. Typically, particles will 'pancake' upon impact at high velocity conditions thereby collapsing any porosity present. By carefully tuning the processing conditions it is possible to create a porous structure for liquid electrolyte penetration.

In the case of solid-state cells, it is significant that the coating be fully dense. However, this implies spraying near the melting temperature of the electrolyte, but not above. And velocities must remain low enough to prevent any type of erosion by the contained active materials. Erosion will occur easily if done at higher spray conditions.

One conventional approach is disclosed in Sunagawa, U.S. Pub. No. 2005/0233066. Sunagawa does not effectively use cold-spray to manufacture an electrode because cold spray enables the build-up of multi layers of material by deformation, bonding, and build-up of impacting particles. In the Sunagawa disclosure, a single layer coating is created by only embedding active material into a substrate, not by deformation of the impacting particle. Sunagawa is able to demonstrate battery performance of this coating only because the current collector acts as the electronic conducting media. Without an electronic conducting media within the actual coating itself, a functioning battery is impossible when attempting multilayer coatings.

In a further example, Sunagawa introduces tin as a binding agent which allows for multi-layer buildup. Sunagawa states cold spray using temperatures for the gas of 300-500° C. It is generally not recommended to cold spray a material at temperatures significantly higher than its melting point. Tin melts at ~232° C. and under high pressures would have likely created a very poor battery structure due to significant molten spatter of the tin particles.

Related approaches include those disclosed in Kobayashi, U.S. Pub. No. 2002/0055041. However, Kobayashi only teaches milling-based approaches, and relies on aluminum, which can present challenges to an agglomerative structure, in contrast to use of a polymer to satisfy both the binder and ionic conduction material (electrolyte) aspects. This further avoids side reactions from closely matching the electrochemical characteristics of the already-used current collectors, as most cathode collectors are aluminum.

The claimed approach teaches agglomerations of materials from component powders (charge, binder, conductor), and then affixing the agglomerates, rather than the raw powders, to a current collector or battery structure. Referring again to Sunagawa, in which cold spray is employed for deposition of lithium-ion battery active materials, a distinction should be observed between MIXED and AGGLOMERATED active and inactive material blends. Mixing, as is traditionally done, simply involves placing two distinct material phases in a container and distributing them homogeneously but as independent particles. Agglomeration, as disclosed herein, involves physically or chemically cohering the different phases together such that each particulate is a combination of active/inactive materials. This is significant because the traditional mixing approach is prohibitive in the ability to build up a homogenous battery structure.

In the disclosed approach, formation of the agglomerations may further include ball milling the conductive medium, the lithium-ion transport medium and the active charge material as powder particles in a ball mill. This includes between 60%-95% by weight of the active charge material using milling balls of a size between 5-15 mm for 6-12 hours. The agglomerations are defined by bonded clusters of powder form of the conductive medium and the active charge material, such that the lithium-ion transport medium includes a polymer adhering the powder form of the conductive medium and the active charge material. The agglomerations remain intact while propelled by the carrier gas, and deform upon impact with a current collector or other agglomerations. The first iteration of agglomerations of course adhere to the current collector, and successive agglomerations deposit on top of the first iterations, such that the deformation of a plurality of agglomerations resulting in an electrode layer of a battery. This forms the agglomerations by surrounding an electrolyte core as the lithium-ion transport medium agglomerated with the active charge material and the conductive medium.

A further approach to forming the agglomerations includes pulverizing a powder form of the active charge material, such that the conductive medium and an electrolyte material are first combined into an agglomeration mixture. Liquid nitrogen is used to cryogenically cool the agglomeration mixture while pulverizing to form the agglomerations. Liquid nitrogen or another cryogenic support material may be added directly or in communication with a vessel of the pulverized polymer mixture. The temperature of the cooled agglomeration mixture and an applied load of the impeller/agitator is selected based on a size of the formed agglomerations. Following evaporation or removal of the nitrogen, the agglomerations warm above the glass transition temperature for achieving a phase transformation of the agglomerations for bonding the active charge material, such that the conductive medium and the electrolyte material form the agglomerations. In one example, the active charge material is a cathode material and the conductive medium is a carbon powder. This approach is depicted below in FIGS. 5-6.

A further approach to forming the agglomerations is by forming a slurry including a solvent with an agglomeration mixture with the conductive medium, the lithium-ion transport medium and the active charge material. In a particular example the formed slurry includes 90% by weight of the solvent with 10% of the agglomeration mixture, and involves propelling the mixture through a nozzle via a carrier gas. The carrier gas heats the inlet of the nozzle to at least 100° C. such that the outlet of the nozzle remains between 50° C. and 63° C. The spray exits the outlet of the nozzle atomized for forming the agglomerations resulting from solvent evaporation in the nozzle. The carrier gas transports and atomizes the slurry at a flow rate of 40 lpm and an aspirator percentage in a range between 70 and 95, in a particular example, however other parameters may be employed.

Once formed by one of the above approaches, the agglomerations are bombarded in into a layered structure for a battery by directing the agglomerations towards a collection surface under the force of the carrier gas. The collection surface is a current collector receiving a first layer or iteration of the sprayed agglomerations, and successive layers of sprayed agglomerations accumulate and layer on previously sprayed agglomerations once the current collector is covered by the first iteration. Successive iterations, or passes, are used to build each layer (cathode, anode, separator) with a suitable thickness of agglomerates. In one example, propulsion of the agglomerates includes injecting a pressurized, heated gas through a nozzle having an exit at a standoff distance between 0.15-0.75 in. distal from the collection surface, and feeding the agglomerations through the nozzle at a feed rate in a range between 2-5 g/min.

Any suitable powders may be employed to form the agglomeration particles. For example, the conductive powders may include materials or alloys of Al, Cu, Sn, Ta, Co, Ni, Si, V, Ga, Li and C. Nonlimiting examples of the cathode material may include $LiNiCoAlO_2$ (NCA), $LiNiMnCoO_2$ (NMC), $LiNi5Co3Mn2O2$ (Hi-NMC), $LiFePO4$ (LFP), $LiCoO2$ (LCO), $LiMn2O4$ (LMO) and $Li4Ti5O12$ (LTO), and anode material may include graphite, silicon, li-sulfur, lithium metal and tin.

Figure 5:
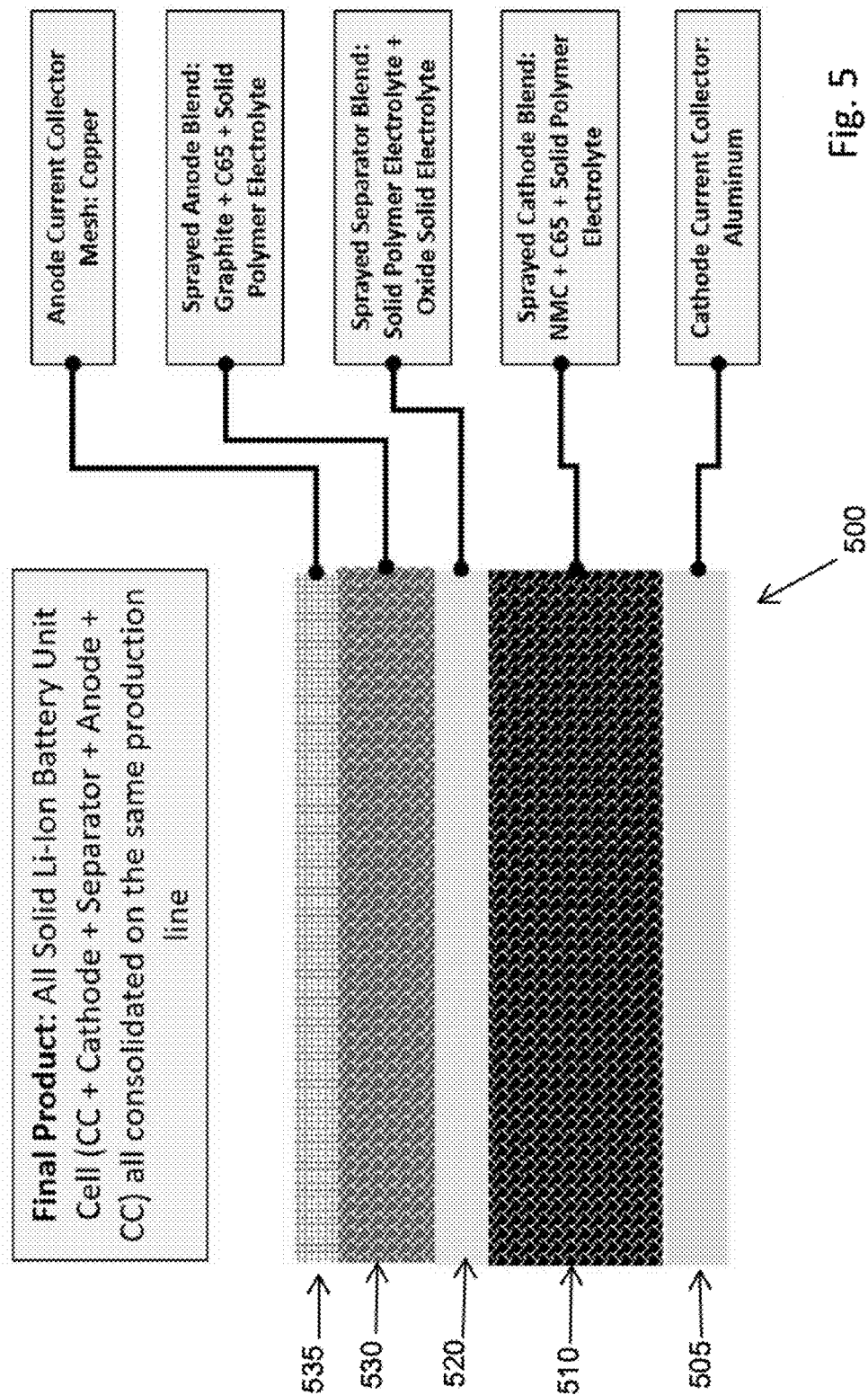
FIG. 5 shows an alternate formation of a layered structure based on agitation of cryogenically treated feedstock.

FIG. 5 shows an alternate formation of a layered structure 500 based on agitation of cryogenically treated feedstock. Referring to FIG. 5, the layered structure includes one or more of a cathode layer 510, an anode layer 530 and a separator layer 520. Each of the layers 510, 520, 530 is formed from spraying successive iterations of agglomerates. A cathode current collector layer 505 such as an aluminum foil or sheet receives the first spray iterations as successive layers are built up. The cathode layer 510 is formed from spraying agglomerates that employ cathodic charge material as the active charge material. The solid-electrolyte separator layer 520 is composed of one or more of solid-polymer, oxide, or sulfide-based electrolytes that are capable of conducting ions and are nonconductive to electrons, thus electrically separating the cathode and anode layer as is required to prevent shorting or runaway discharge. The anode layer 530 employs anode charge material as the active charge material. An anodic current collector such as a copper mesh or sheet 535 completes the battery cell, such that the cathode layer 510, separator layer 520 and anode layer 530 define a solid-state lithium-ion battery unit cell.

Conventional approaches spray or deposit a powder form of cathode, anode and related binder and conductor. The agglomerates, in contrast, define particles of uniformly distributed constituent materials. The conductive medium, lithium-ion transport medium and the active charge material define a granular texture and the layered structure of deformed agglomerates define a distributed network of distinct granular particles. The network resulting from bombardment and deformation of the agglomerates form a regular distribution, such that a substantially uniform distance results from a particle of one distinct granular particle to a proximal distinct granular particle of a same type. In other words, a charge material particle lies approximately the same distance from the next charge material particle, and so on. In the example shown in FIG. 5, depending on the layer, the active charge material may be a cathode material and the conductive medium is a carbon powder, or the active charge material is an anode material and the conductive medium include carbon powder and graphite. However, it should be noted that as the agglomerates deform and flatten or "pancake" upon impact, the resulting layered structure exhibits an absence of distinct boundaries between the deformed agglomerates. In other words, the uniform distribution of the agglomerates is imputed to the resulting layered structure as it cannot be observed where the different agglomerates landed.

Figure 6:
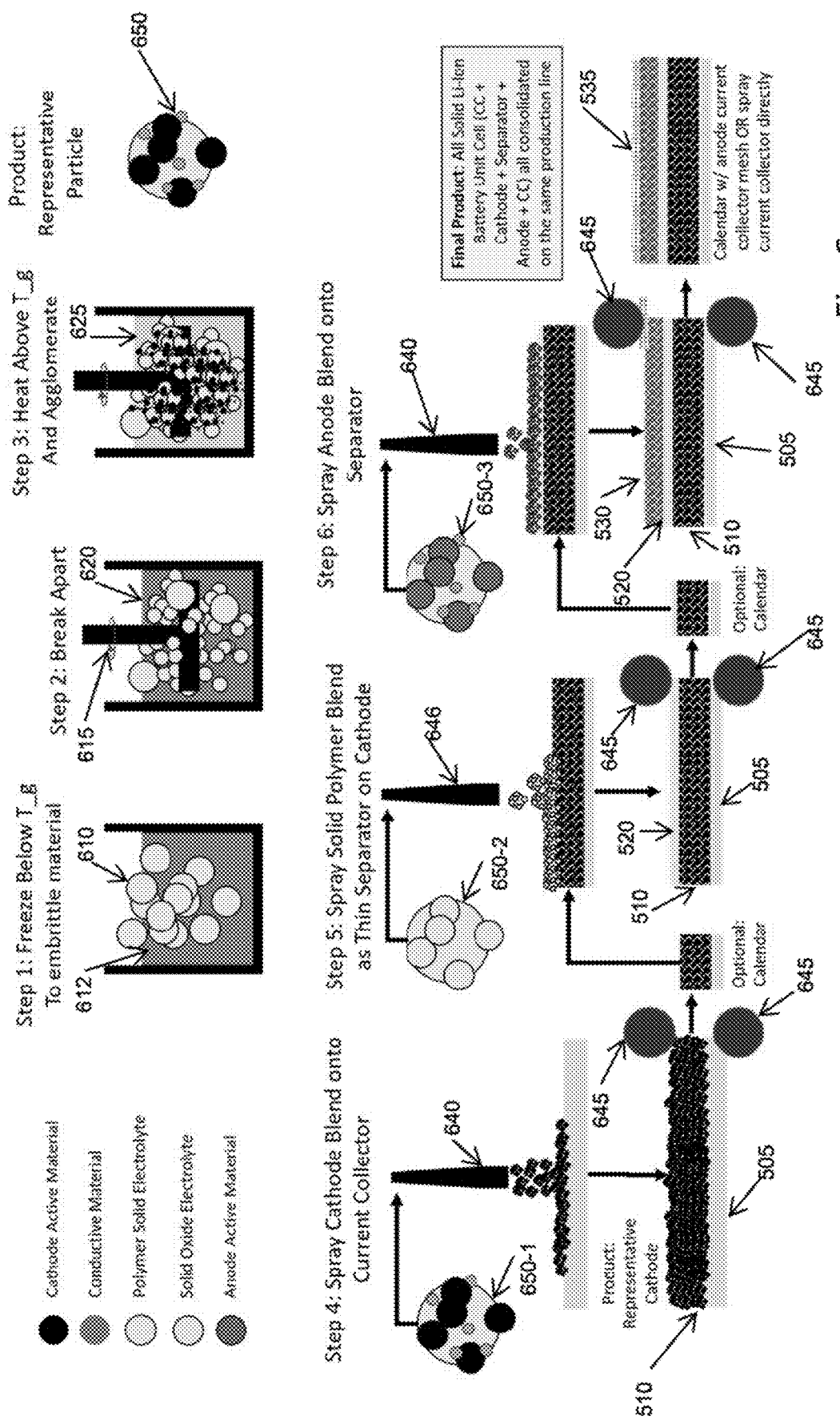
FIG. 6 shows the formation sequence for fabricating the layered arrangement as in FIG. 5.

FIG. 6 shows the formation sequence resulting in the layered arrangement of FIG. 5. Referring to FIGS. 5 and 6, the method of forming a solid-state battery includes combining a solid granular form of each of a solid polymer electrolyte, a conductive medium and an active charge material for forming a mixture for a cathode or anode layer. The solid polymer electrolyte 610 becomes brittle below a glass transition temperature $T\_g$. Liquid nitrogen 612 is employed to cool the mixture below the glass transition temperature of the solid polymer electrolyte 610. An impeller 615 or other physical agitating or pulverizing member agitates the cooled mixture 620 to form particles of each of the solid polymer electrolyte, a conductive medium and an active charge material. During this step, the brittle nature of the cooled polymer electrolyte achieves a particulate size and structure for facilitating subsequent agglomerations. Conventional polymers tend to remain malleable or flexible, and refrain from breaking apart into pulverized particles.

Figures 3A, 3B, 3C:
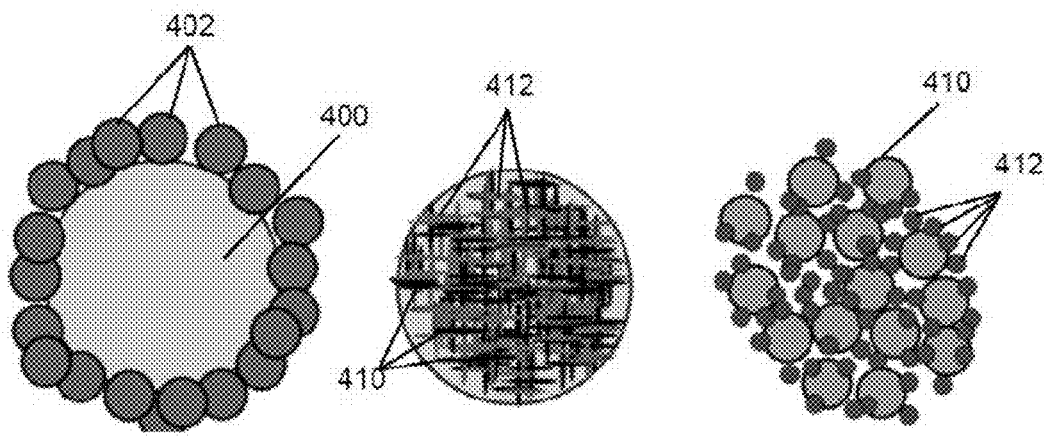
FIGS. 3A-3C show particles used for feedstock in the flow of FIG. 2 and resulting agglomerates.

The mixture with the pulverized polymer 625 is warmed above the glass transition temperature while continuing agitation for forming the agglomerates 650. The agglomerates 650 include particles of the conductive medium and the active charge material bonded by the solid polymer electrolyte to define the agglomerates 650, and may appear similar to the structures of FIGS. 3A-3C. The cooling, pulverizing/agitating and warming steps may be taken in succession for each of the functional layers of the battery, including the cathode, separator and anode, from using different formulations of charge material and conductive particles. A further beneficial aspect is provided by the same solid polymer functioning as the electrolyte and binder at each of the layers.

A subsonic pressure nozzle 640 propels the agglomerates 650 at a predetermined temperature and predetermined pressure based on the glass transition temperature and melting temperature of the solid polymer electrolyte. This temperature and pressure provides for proper deformation of the agglomerates 650 upon impact with the current collector or other layered agglomerates. The steady stream of agglomerates 650 are each responsive to an impact against a collection surface (current collector 505 or the accumulated layer 510, 520, 530) for forming a layered structure for an active charge material layer of a battery based on the deformation. The energy of the propelled agglomerates causes deformation that reduces a dimension of the agglomerates along an axis defined by a direction of travel imposed by the subsonic pressure nozzle, causing a "flattening" or "pancake" effect. The formed layered structure defines a well distributed network of distinct particles of each the solid polymer electrolyte, conductive medium and an active charge material for forming a mixture for a cathode or anode layer for defining a regular distribution of a distance between like particles. The deformed particles across the layers 510, 520 and 530 form a uniform, evenly distributed or homogenous layer such that the former agglomeration boundaries are indiscernible.

For the battery structure of FIG. 5, three types of agglomerates are employed to form the cathode 650-1, separator 650-2 and anode 650-3 layers. The subsonic nozzle 640 forms the cathode layer 510 including a cathode material as the active charge material. Calendaring with rollers 645 may be performed on one or more of the cathode, anode, and separator layers for smoothing and densifying the layered structure. Following sufficient passes for depositing agglomerates 650-1, the separator layer 520 is formed including the solid polymer electrolyte that defining an ionic transport medium and a binder. The separator layer 520 also includes a solid oxide electrolyte, shown in agglomeration 650-2, rather than a separator defined exclusively by the ionic polymer, although this configuration could certainly be performed. Lastly the anode layer 530 is formed, including an anode material as the active charge material, as shown by agglomeration 650-3. A planar material, such as a copper mesh or sheet, forms the anode current collector 535 in electrical communication with the anode layer. The bombarded/deformed agglomerates therefore form a well distributed network having an absence of distinct boundaries between the previously formed agglomerates deformed against the collection surface, forming a continuous, robust cathode, separator and anode layers.

Formation of multiple cells, using successive iterations and application of insulators and/or polymers, aggregates multi-cell battery assembly. The structure of the solid-state lithium-ion battery unit cell may be encased by further spraying a protective layer for isolating the solid-state lithium-ion battery unit cell from ionic or conductive contact. This may include spraying a protective layer to isolate the battery from ionic or conductive contact. Further, multiple unit cells may be serially sprayed to consolidate a multi-layer lithium ion battery that comprises the entirety of a Li-ion battery cell. The encasing material may be a polymer or ceramic with an additional metal or polymer layers for structural/penetration protection. Multiple sprayed cells may be joined in serial or parallel in-situ to the production of the battery cell in order form a battery pack.

While the system and methods defined herein have been particularly shown and described with references to embodiments thereof, it will be understood by those skilled in the art that various changes in form and details may be made therein without departing from the scope of the invention encompassed by the appended claims.

What is claimed is:
1. A method of forming a solid-state battery, comprising:
cooling a granular form of a lithium-ion transport medium below a glass transition temperature $T\_g$ of a conductive polymer included in the lithium-ion transport medium for imparting a brittle granular texture to the cooled, granular form of the lithium-ion transport medium;

forming agglomerates including a conductive medium, the lithium-ion transport medium and an active charge material, the agglomerates including particles of evenly dispersed powders of the conductive medium and the active charge material bonded by the lithium-ion transport medium;

propelling the agglomerates at a predetermined temperature and a predetermined pressure to form sprayed agglomerates, the predetermined temperature based on the glass transition temperature of the conductive polymer included in the lithium-ion transport medium, and the predetermined pressure based on deformation of the sprayed agglomerates upon impact at the predetermined temperature; and accumulating the sprayed agglomerates for deforming the sprayed agglomerates responsive to an impact against a collection surface and forming a layered structure for an active charge material layer of a battery based on multiple spraying iterations of the sprayed agglomerates for propelled deformation.

2. The method of claim 1 wherein the conductive medium, the lithium-ion transport medium and the active charge material define a granular texture and the layered structure of the deformed, sprayed agglomerates defines a distributed network of distinct granular particles, the network having a regular distribution of a distance from a particle of one distinct granular particle to a proximal distinct granular particle of a same type.

3. The method of claim 1 further comprising forming the agglomerates by:
   pulverizing a powder form of the active charge material, the conductive medium and an electrolyte material into an agglomeration mixture;
   cryogenically cooling the agglomeration mixture below a glass transition temperature of the electrolyte material while pulverizing, the temperature of the cooled agglomeration mixture based on a size of the formed agglomerations; and
   warming the agglomerations above the glass transition temperature of the agglomerations for bonding the active charge material, the conductive medium and the electrolyte material into the agglomerates.

4. The method of claim 3 further comprising adding liquid nitrogen to the agglomeration mixture for reducing the temperature during pulverizing.

5. The method of claim 1 wherein the active charge material is an cathode material and the conductive medium is a carbon powder.

6. The method of claim 1 wherein the active charge material is an anode material and the conductive medium include carbon powder and graphite.

7. The method of claim 3 wherein the layered structure exhibits an absence of distinct boundaries between the deformed agglomerates.

8. The method of claim 3 wherein the agglomerates are clusters of particulate forms of the conductive medium and the active charge material, bonded by a polymer defining the lithium-ion transport medium; and
   the agglomerates remain intact during propulsion by a carrier gas and deform upon impact on a current collector or others of the sprayed agglomerates,
   the deformation of a plurality of the sprayed agglomerates resulting in an electrode layer of a battery.

9. The method of claim 1 further comprising forming the agglomerates by encapsulating an electrolyte core as the lithium-ion transport medium agglomerated with the active charge material and the conductive medium.

10. The method of claim 1 wherein forming the agglomerates further comprises:
    ball milling the conductive medium, the lithium-ion transport medium and the active charge material as powder particles in a ball mill, including between 30%-95% by weight of the active charge material using milling balls of a size between 5-15 mm for 6-12 hours.

11. The method of claim 1 further comprising:
    forming the agglomerates from a slurry including a solvent with an agglomeration mixture including the conductive medium, the lithium-ion transport medium and the active charge material.

12. The method of claim 11 wherein the slurry includes 90% by weight of the solvent with 10% of the agglomeration mixture, further comprising propelling via a carrier gas through a nozzle, the carrier gas heating an inlet of the nozzle to at least 100° C. and an outlet of the nozzle remaining between a predetermined temperature range based on the solvent; and
    accumulating the sprayed agglomerates exiting the outlet of the nozzle atomized for forming the sprayed agglomerates resulting from solvent evaporation in the nozzle.

13. The method of claim 1 wherein the collection surface is a current collector receiving a first layer of the sprayed agglomerates, and successive layers of sprayed agglomerates accumulating and layering on previously sprayed agglomerates.

14. The method of claim 13 wherein propelling further includes injecting a pressurized, heated gas through a nozzle, the nozzle having an exit at a standoff distance between 0.15-0.75 in. distal from the collection surface, and feeding the agglomerates through the nozzle at a feed rate based on a thickness of a layer formed by the sprayed agglomerates on the collection surface.

15. The method of claim 1 wherein the conductive particles include materials or alloys selected from the group consisting of Al, Cu, Sn, Ta, Co, Ni, Si, V, Ga, Li and C.

16. The method of claim 1 wherein the active material includes cathode material selected from the group consisting of $LiNiCoAlO_2$ (NCA), $LiNiMnCoO_2$ (NMC), $LiNi_5Co_3Mn_2O_2$ (Hi-NMC), $LiFePO_4$ (LFP), $LiCoO_2$ (LCO), $LiMn_2O_4$ (LMO) and $Li_4Ti_5O_{12}$ (LTO).

17. The method of claim 1 wherein the active material includes anode material selected from the group consisting of Graphite, Silicon, Li-Sulfur, Lithium metal and tin.

18. The method of claim 1 wherein the layered structure includes one or more of a cathode layer, an anode layer and a separator layer, further comprising:
    forming a cathode layer from the sprayed agglomerates employing cathodic charge material as the active charge material;
    forming an anode layer from the sprayed agglomerates employing anode charge material as the active charge material,
    wherein the anode layer and cathode layer are electrically isolated by consolidating a solid-electrolyte separator layer composed of one or more solid-polymer, oxide, or sulfide-based electrolytes capable of conducting ions and nonconductive to electrons.

19. The method of claim 18 further comprising calendaring one or more of the cathode, anode, and separator layers for smoothing and densifying the layered structure.

20. The method of claim 18 further comprising:
    iteratively consolidating the cathode layer, separator layer and anode layer, the cathode layer, separator layer and anode layer defining a solid-state lithium-ion battery unit cell; and encasing the solid-state lithium-ion battery unit cell by further spraying a protective layer for isolating the solid-state lithium-ion battery unit cell from ionic or conductive contact.

21. The method of claim 20 wherein further comprising spraying multiple layers in a sequence to form a multi-layer lithium ion battery that defines a Li-ion battery cell.

* * * * *